(No Model.)
H. C. HART.
MANUFACTURE OF KNIFE HANDLES.
No. 338,521. Patented Mar. 23, 1886.
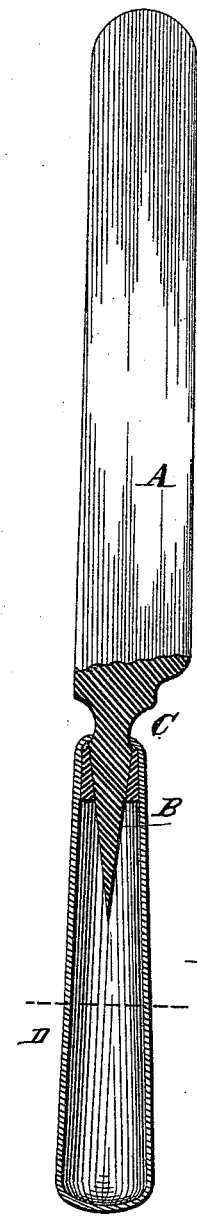
Fig. 1.
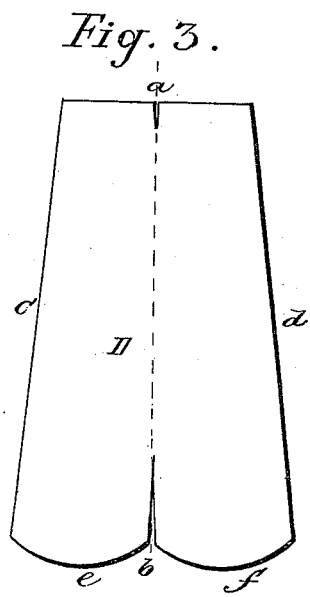
Fig. 3.
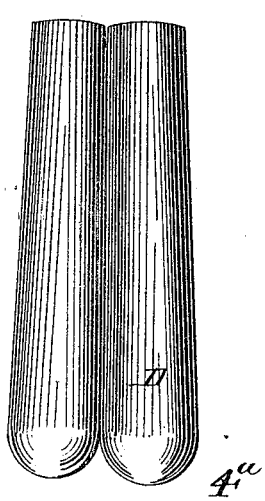
Fig. 4.
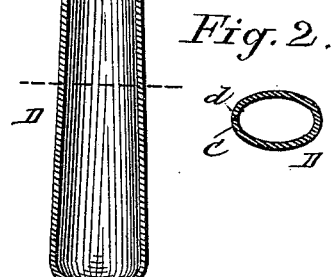
Fig. 2.
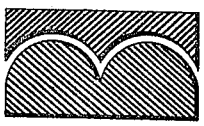
Fig. 5.
WITNESSES:
ed. G. Dieterich.
Arthur L. Morsell.
Hubert C. Hart,
INVENTOR.
By Louis Bagger & Co.
ATTORNEYS.

UNITED STATES PATENT OFFICE.

HUBERT C. HART, OF UNIONVILLE, CONNECTICUT.

MANUFACTURE OF KNIFE-HANDLES.

SPECIFICATION forming part of Letters Patent No. 338,521, dated March 23, 1886.

Application filed November 2, 1883. Renewed February 11, 1886. Serial No. 191,638. (No model.)

*To all whom it may concern:*

Be it known that I, HUBERT C. HART, a citizen of the United States, and a resident of Unionville, in the county of Hartford and State of Connecticut, have invented certain new and useful Improvements in Knife-Handles; and I do hereby declare that the following is a full, clear, and exact description of the invention, which will enable others skilled in the art to which it appertains to make and use the same, reference being had to the accompanying drawings, which form a part of this specification.

My invention has relation to the manufacture of table-knives made wholly of metal; and it consists in the improved method, as hereinafter more fully described and claimed, of manufacturing a hollow sheet-metal handle, which is made with a seamless back, so that it has to be brazed only along one edge of the handle, and the butt or bottom of which is thicker and wider than the top part or neck where the handle is fastened to the tang of the blade.

On the accompanying sheet of drawings I have shown the various steps or stages of my improved method or process, Figure 1 showing a longitudinal sectional view of the complete knife; Fig. 2, a cross-section through the finished handle; Fig. 3, a plan view of the flat sheet-metal blank; Fig. 4, a similar view after the same has been struck up or bulged in an appropriate die; and Fig. 5, a perspective view of the handle after the same has been folded or doubled to its proper shape on the line of the seamless back, but before brazing the edges.

In the several figures like letters of reference indicate corresponding parts.

A is the steel blade of the knife, which has the usual tang, B, and bolster C. The handle is made by cutting a piece of sheet metal into the shape shown in Fig. 3, so as to form a sharp clear-cut edge. This may readily be done by a suitably-constructed sharp-edged die, or by cutting the flat sheet of metal, after the same has been properly out-lined by a suitable pattern, with a sharp-edged cutting-tool. The flat blank D thus formed is placed in a die, (shown in Fig. 4ª,) and by subjecting it to pressure is bulged or shaped as shown. The bulged blank is thereupon bent across the dotted line *a b*, doubling the parts lengthwise upon each other, as shown in Fig. 5, after which the edges *c* and *d* of the sides and *e* and *f* of the bulged lower ends of the blank are brazed, uniting the doubled parts of the handle, which now may be attached to the blade and be finished and plated in any desirable manner.

I am well aware that knives have been made before, having hollow metallic handles; but as heretofore manufactured such handles have been made in two separate parts, requiring brazing all around the edges where the two parts or sections are united to one another. I produce a seamless back, which requires brazing only along one edge and along the bottom, and which is shaped to its proper form simply by two operations—viz., first, by striking it up upon the double die (shown in Fig. 4ª,) and, secondly, by bending the shaped or bulged blank, as shown in Fig. 5, leaving an opening, E, at the top for the insertion of the tang.

Having thus described my invention, I claim and desire to secure by Letters Patent of the United States—

The hereinbefore-described method of manufacturing handles for table-knives, which consists in, first, cutting a flat blank of requisite shape from a piece of sheet metal; second, shaping or bulging said blank upon a double-faced die; thirdly, bending the shaped blank across a line between the bulges longitudinally; fourthly, uniting the meeting edges of the bent and shaped blank by brazing, substantially as and for the purpose shown and set forth.

In testimony that I claim the foregoing as my own I have hereunto affixed my signature in presence of two witnesses.

HUBERT C. HART.

Witnesses:
 WILLIAM DELONEY,
 CARLOS L. MASON.